July 28, 1959
A. H. WHISLER
2,896,553
MEANS FOR CONVERTING HIGHWAY MOTOR VEHICLES FOR RAILWAY TRAVEL
Filed Oct. 4, 1955
4 Sheets-Sheet 2
FIG_3_
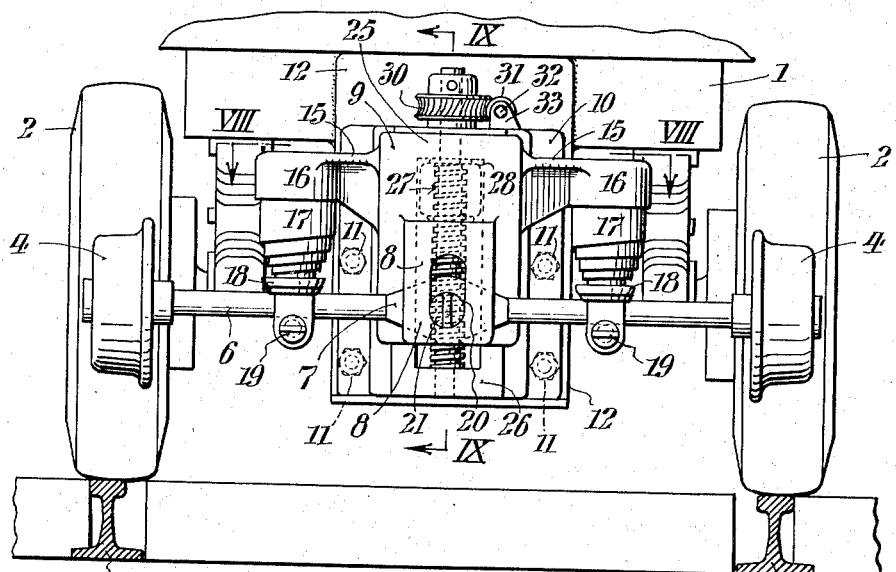
FIG_4_
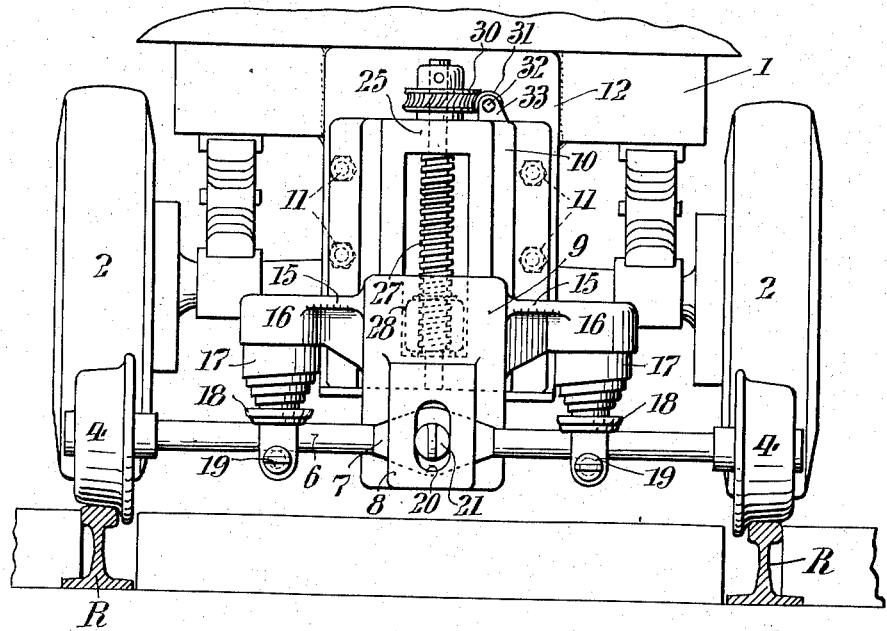
INVENTOR.
Alfred H. Whisler,
BY Paul & Paul
ATTORNEYS.

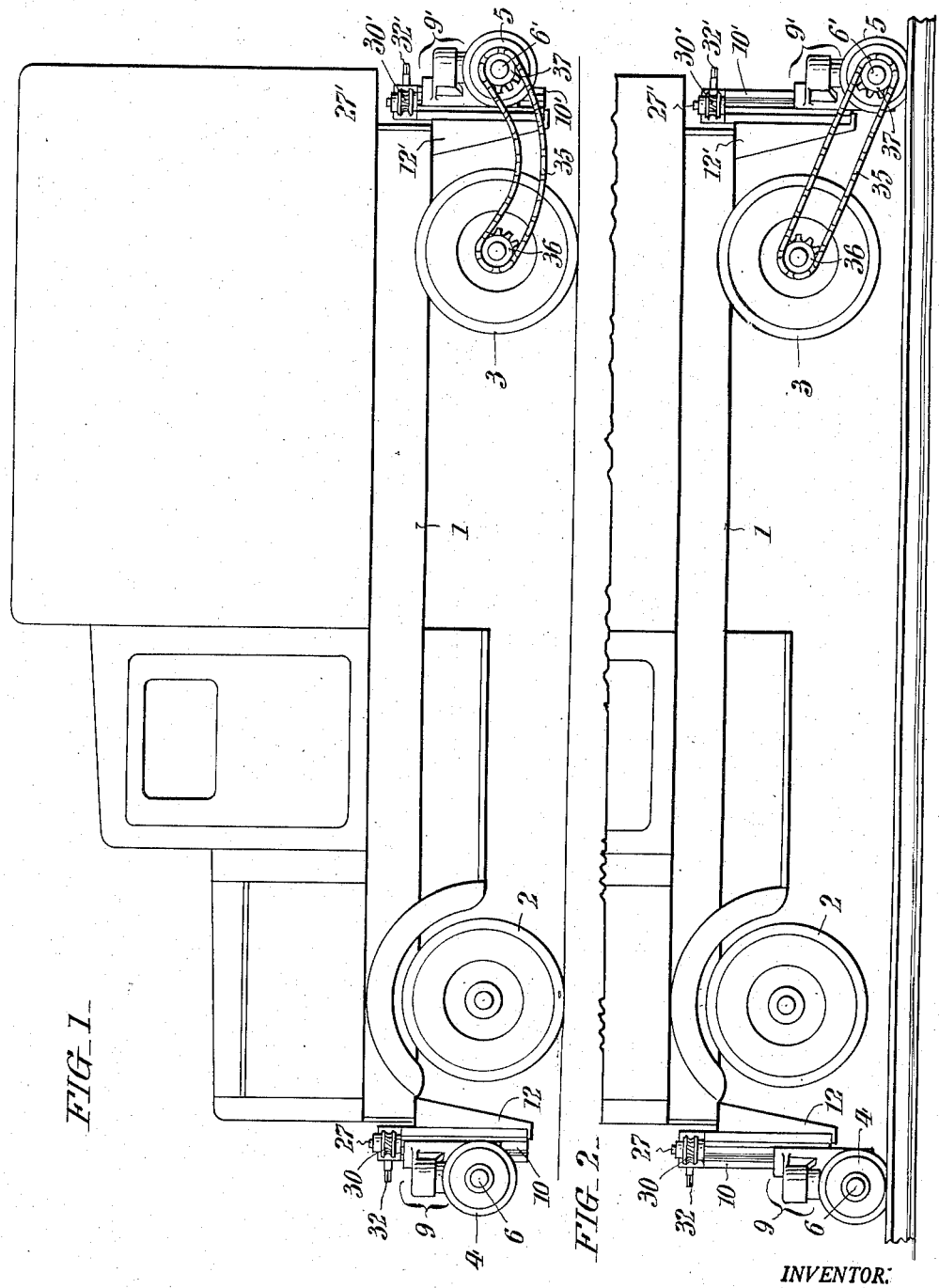

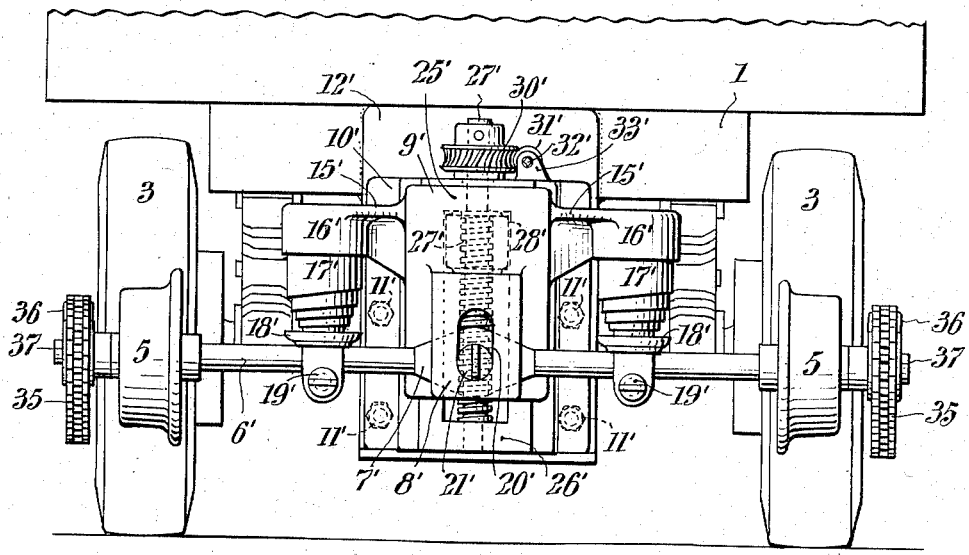
FIG_5_
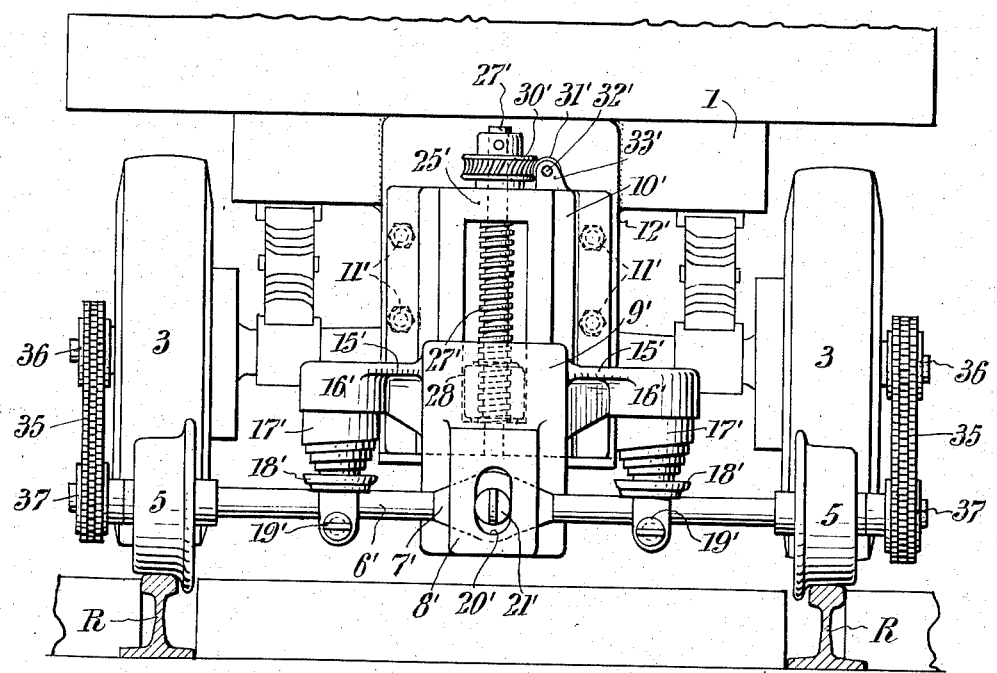
FIG_6_

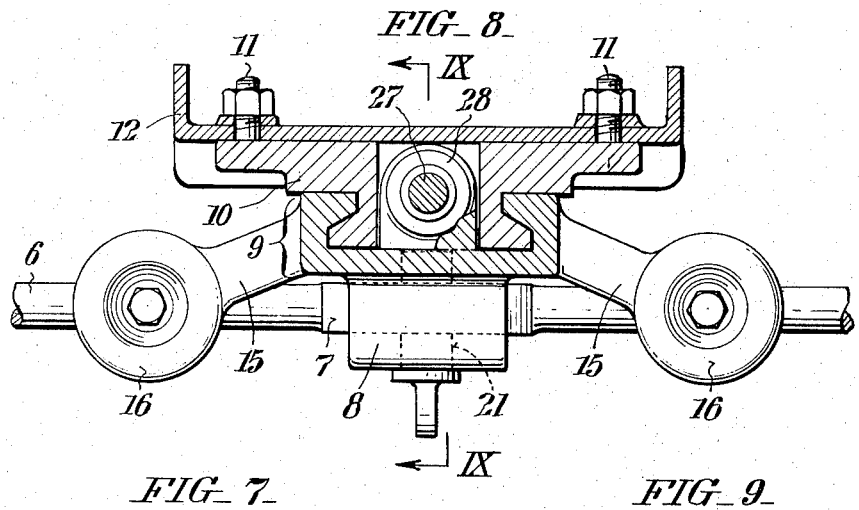
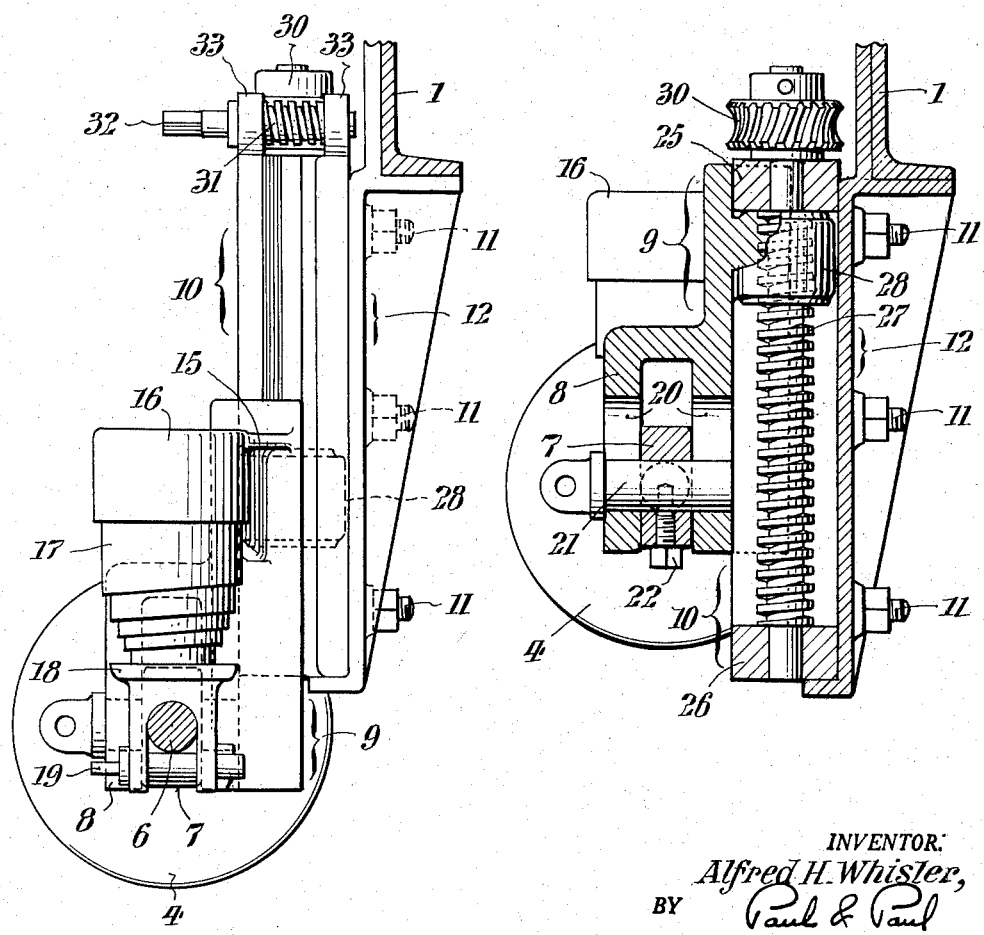

United States Patent Office 2,896,553
Patented July 28, 1959

2,896,553

MEANS FOR CONVERTING HIGHWAY MOTOR VEHICLES FOR RAILWAY TRAVEL

Alfred H. Whisler, Philadelphia, Pa.

Application October 4, 1955, Serial No. 538,342

4 Claims. (Cl. 105—215)

This invention relates to means for converting highway vehicles, such as motor trucks, automobiles and the like so that they can be run under their own power upon the tracks of a railway.

The chief aim of my invention is to provide means for the above purpose in the form of an attachment which is simple in construction; which can be readily embodied in standard motorized highway vehicles at relatively small expense without requiring any structural changes in them or in their normal mode of operation; and which can be quickly and easily arranged to convert the vehicles for rail use and as quickly re-arranged to restore them to normal condition for highway travel.

Other objects and attendant advantages will appear from the following detailed description of the attached drawings, wherein:

Fig. 1 is a view in side elevation of a highway motor vehicle with mechanism whereby the same can be adapted for railway travel in accordance with my invention.

Fig. 2 is a view corresponding to Fig. 1 showing the vehicle arranged for travel on a railway.

Figs. 3 and 4 are views on a larger scale showing the vehicle in front elevation and arranged respectively as shown in Figs. 1 and 2.

Figs. 5 and 6 are views on a larger scale showing the vehicle in rear elevation when arranged as in Figs. 1 and 2 respectively.

Fig. 7 is a fragmentary view in elevation corresponding to Fig. 1 and drawn to a still larger scale with a portion of the vehicle chassis shown in section.

Fig. 8 is a detail view in horizontal section taken as indicated by the angled arrows VIII—VIII in Fig. 3; and Fig. 9 is a fragmentary detail view in vertical section taken as indicated by the angled arrows IX—IX in Fig. 3.

The highway vehicle herein illustrated, for convenience of exemplification, is in the form of a motor truck having a chassis frame 1, steerable front wheels 2, and powered rear or propelling wheels 3. It is to be understood that, although not shown, the vehicle is provided, as usual, with brake means.

In order to adapt such a vehicle for travel on a railway, I have devised, in accordance with my invention, conversion means including a pair of auxiliary flanged wheels 4 ahead of steering wheels 2, and a pair of auxiliary flanged wheels 5 rearward of the powered wheels 3, said auxiliary wheels being normally held raised at a substantial elevation clear of the ground as in Figs. 1 and 3 when the vehicle is ordinarily used on highways.

The auxiliary front wheels 4 are free to revolve about the ends of an axle 6 which, at the center, has a flat-sided enlargement 7 engaged in the clevised portion 8 of a slide 9. From Fig. 8 it will be observed that the head 9 is channelled in cross section and dove tail engaged with a guide member 10 which is secured, by bolts 11, to a pendent bracket 12 welded or otherwise rigidly affixed to the front end of the chassis frame 1 of the vehicle at the center. Arms 15 extending horizontally from opposite sides of the head 9 have downwardly-open sockets 16 at their distal ends in which, respectively, the top ends of vertical axis coil springs 17 are seated, the bottom ends of said springs bearing upon clevised saddles 18 engaged upon the axle of the auxiliary wheels 4 and held thereto by retractable locking pins 19.

As shown, the clevised portion 8 of the slide head 9 is formed with vertical slots 20 which are engaged by the opposite ends of the cross pin 21 removably fixed by a set screw 22 (Fig. 9) within the central flattened portion 7 of the axle 6. Rotative in upper and lower bearings 25 and 26 of the guide member 10 is a vertical axis square-threaded jack screw 27 which is engaged in a correspondingly tapped rearward projecting boss 28 of the head 9. To the top protruding end of the jack screw 27 is secured a worm wheel 30 with which meshes a worm 31 on a short horizontal shaft 32 journalled in upstanding bearing lugs 33 at the top of the guide member 10, one end of the latter shaft being made polygonal for application thereto of an actuating crank handle, not illustrated.

The mounting arrangement for the rear auxiliary wheels 5 is identical with that above described for front auxiliary wheels 4. Therefore, in order to avoid the necessity for repetitive description, the components of the rear auxiliary wheel mounting, having their counterparts in the front auxiliary wheel mounting, are identified by the same reference numerals, with addition in each instance, however, of a prime for convenience of more ready distinction. Power or braking restraint are transmitted to the rear auxiliary wheels 5 from the drive wheels 3 of the vehicle through the medium of sprocket chains 35 connecting sprocket wheels 36, 37 which, respectively, are secured to said drive and auxiliary wheels.

Operation

Normally, for highway travel of the vehicle, the slides 9 and 9' are fully raised as in Figs. 1, 3 and 5 with the auxiliary wheels 4, 5 high above the road level. When the vehicle is to be converted to rail travel, it is run, as shown in Fig. 4, onto a railway crossing to align its steering and drive wheels 2 and 3 with the track rails R. With this accomplished, the jack screws 27 and 27' are turned, by means of hand cranks applied to the squared ends of the worm shafts 32, 32', to lower the slides 9 and 9' to bring the auxiliary wheels 4, 5 first into engagement with the track rails R and thereafter cause the vehicle to be bodily raised to clear its steering and drive wheels 2 and 3 from said rails as in Figs. 2, 4 and 6. The vehicle is thereafter supported solely by the auxiliary wheels 4 and 5, and in rail travel, is propelled by power transmitted to the auxiliary wheels 5 from the drive wheels 3 of the vehicle through the sprocket chains 35. Shocks encountered during rail travel are effectively absorbed by the springs 17 and 17' incident to which the cross pins 21 and 21' at the centers of the auxiliary wheel axles 6 and 6' are free to move up and down in the vertical slots 20, 20' in the clevised portions 8 and 8' of the slide heads 9 and 9' in a manner readily understood from Figs. 4 and 6. It will also be observed from Figs. 4 and 6 that a certain amount of pivotal action of the auxiliary wheel axles 6 and 6' about the cross pins 21 and 21' as centers can take place during rail travel on banked railway curves and over uneven stretches of the track rails. In rail travel, braking is accomplished in the normal way, the braking effect being transmitted from the rear drive wheels 3 of the vehicle to the auxiliary wheels 5 through the chains 35. To restore the vehicle to normal condition for highway travel after a rail destination has been reached, the above procedure is simply reversed, i.e., the jack screws 27, 27' are turned in the opposite direction to bring the wheels 2 and 3 into contact with the rails R and to raise the auxiliary wheels 4 and 5 back to the positions in which they are shown in Figs. 1, 3 and 5 in readiness for the truck to be run onto the highway. After restoration of the vehicle for highway travel, the chains 35 may be allowed to hang freely suspended as in Fig. 1 or, in order to avoid idle driving of the rear auxiliary wheels 5, said chains may be removed until their use is again required.

Thus, from the foregoing it will be seen that the conversion mechanism of my invention is simple in construction, and requires no changes in standard motorized highway vehicles except for connection of brackets respectively to the front and rear ends of the chassis frames of such vehicles, the self contained front and rear auxiliary wheel-carrying assemblies being secured to said brackets by screw bolts in such manner as to be easily and quickly applied or removed, at small expense from the standpoint of labor costs. In this connection it will be observed that, in the event that replacements should be necessary, the axles 6 and 6' with the auxiliary wheels 4 and 5 can be easily and quickly removed, simply by withdrawing the pins 21 and 21' by which they are connected to the slides 9 and 9', and by removing the pins 19 and 19' by which they are held to the spring saddles 18 and 18'.

Having thus described my invention, I claim:

1. Attachment means for converting a standardized highway truck vehicle for travel on a railway track, said means comprising two similar self-contained units adapted to be applied respectively to the front and rear ends of the vehicle, each such unit including a vertical guide member removably secured by a screw bolt to a bracket pendent from an end cross bar of the chassis frame of the vehicle at the center; a slide constrained to up and down movement in the guide member and having oppositely-directed lateral projections; a transverse axle with flanged auxiliary track wheels at opposite ends thereof pivotally connected at the center to the slide; auxiliary compression springs interposed respectively between the distal ends of the lateral projections of the slide and the track wheel axle; and adjusting means associated with the guide member for lowering the slide from a normal raised position to bring the auxiliary wheels into engagement with the rails of the railway track and to raise the vehicle bodily for support solely by said auxiliary wheels.

2. The invention according to claim 1, wherein the adjusting means comprises a vertical shaft which is rotatably engaged at opposite ends in spaced bearings on the guide and is threaded in the interval between said bearings; and wherein the slide has a tapped lug engaged with the threaded portion of the shaft.

3. The invention according to claim 1, wherein the auxiliary wheel axle of each unit has a cross pin at the center; wherein the slide is formed with a clevis projection having vertical motion-limiting slots in which the opposite ends of the cross pin of the axle are engaged.

4. A conversion attachment means according to claim 1 for a vehicle having front steering wheels and powered rear wheels; and further including sprocket wheel connections respectively between the rear wheels of the vehicle and the shaft of the auxiliary wheels of the conversion unit at the back end of the vehicle.

References Cited in the file of this patent

UNITED STATES PATENTS

| | | |
|---|---|---|
| 1,512,755 | Galbraith | Oct. 21, 1924 |
| 1,906,109 | Schmidt | Apr. 25, 1933 |
| 2,157,651 | Fildes | May 9, 1939 |
| 2,630,766 | Wunsch | Mar. 10, 1953 |